United States Patent
Wu

(10) Patent No.: US 10,012,730 B1
(45) Date of Patent: Jul. 3, 2018

(54) SYSTEMS AND METHODS FOR COMBINED MOTION AND DISTANCE SENSING

(71) Applicant: Google Inc., Mountain View, CA (US)

(72) Inventor: Honglei Wu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 435 days.

(21) Appl. No.: 14/812,885

(22) Filed: Jul. 29, 2015

(51) Int. Cl.
*G01B 21/16* (2006.01)
*G01B 17/00* (2006.01)
*G01B 11/14* (2006.01)
*G01S 15/88* (2006.01)
*G01S 15/52* (2006.01)
*G01S 15/08* (2006.01)

(52) U.S. Cl.
CPC ............. *G01S 15/88* (2013.01); *G01S 15/08* (2013.01); *G01S 15/523* (2013.01)

(58) Field of Classification Search
CPC ......... G01S 15/88; G01S 15/08; G01S 15/523
See application file for complete search history.

(56) References Cited

U.S. PATENT DOCUMENTS

| | | | | |
|---|---|---|---|---|
| 5,508,974 | A * | 4/1996 | Meyer ................... | G01S 15/101 367/97 |
| 6,075,333 | A * | 6/2000 | Huddle ................... | E06B 9/68 318/266 |
| 8,416,071 | B2 | 4/2013 | Adcook et al. | |
| 2015/0032412 | A1 * | 1/2015 | Chizhevskiy ........... | G01S 17/00 702/158 |

OTHER PUBLICATIONS

SensorWiki.org, "Ultrasound." Apr. 11, 2011. Downloaded on May 20, 2015. Available at: http://www.sensorwiki.org/doku.php/sensors/ultrasound.
GlobalSpec.com, "Optical Triangulation Position Sensors Information." Oct. 5, 2014. Downloaded on May 20, 2015. Available at: http://www.globalspec.com/learnmore/sensors_transducers_detectors/linear_position_sensing/optical_triangulation_position_sensors.
Kinney, Thomas A. "Proximity sensors compared: Inductive, capacitive, photoelectric, and ultrasonic." Machinedesign.com. Sep. 1, 2001. Downloaded on Jul. 21, 2015. Available at: http://machinedesign.com/sensors/proximity-sensors-compared-inductive-capacitive-photoelectric-and-ultrasonic.

* cited by examiner

*Primary Examiner* — Daniel T Pihulic
(74) *Attorney, Agent, or Firm* — Shumaker & Sieffert, P.A.

(57) ABSTRACT

A system and method are provided for detecting motion and calculating distance to a moving object by a sensor device. The sensor device includes: a transducer device configured to transmit a first signal and receive a second signal, wherein the second signal comprises a reflection from a moving object; a motion processing unit configured to receive and process data corresponding to the second signal, and, based on the processing corresponding to the second signal, the transducer device is configured to transmit a third signal and receive a reflected fourth signal; and the distance processing unit is configured to process the data corresponding to the fourth signal to determine a distance between the sensor device and the moving object, wherein the distance processing unit is turned off when the motion processing unit is processing data and vice versa.

20 Claims, 7 Drawing Sheets

SYSTEMS AND METHODS FOR COMBINED MOTION AND DISTANCE SENSING

BACKGROUND

Motion sensors are known in building automation and other applications. Motion sensors are currently installed in almost every office and in many homes. The most popular applications of motion sensors are to automatically control lighting (also known as "occupancy sensors") and to automatically open doors.

Distance sensors also exist in many applications, although not as omnipresent as motion sensors. Distance sensors of various types are used in many different kinds of industrial applications, such as radar. In consumer products, there are a few examples of distance sensing, most notable of them being triangulation-based distance sensors used on some video game consoles.

SUMMARY

One embodiment of the disclosure provides a sensor device that includes a transducer, a motion processing unit, and a distance processing unit. The transducer device is configured to transmit a first ultrasonic signal and receive a second ultrasonic signal indicating detection of motion, wherein the second ultrasonic signal comprises a reflection of the first ultrasonic signal from a first moving object. The motion processing unit is configured to receive data corresponding to the second ultrasonic signal and process the data corresponding to the second ultrasonic signal, where a distance processing unit included in the sensor device is turned off when the motion processing unit is processing the data corresponding to the second ultrasonic signal, and where, based on processing the data corresponding to the second ultrasonic signal, the transducer device is configured to transmit a third ultrasonic signal and receive a fourth ultrasonic signal, wherein the fourth ultrasonic signal comprises a reflection of the third ultrasonic signal from the first moving object. The distance processing unit is configured to process the data corresponding to the fourth ultrasonic signal to determine a distance between the sensor device and the first moving object, where the motion processing unit is turned off when the distance processing unit is processing the data corresponding to the fourth ultrasonic signal.

Another embodiment of the disclosure provides a method and computer-readable medium for detecting motion and calculating distance to a moving object by a sensor device. The method includes: transmitting, from a first transmitter of one or more transmitter devices, a first ultrasonic signal; receiving, at a first receiver of one or more receiver devices, a second ultrasonic signal indicating detection of motion, wherein the second ultrasonic signal comprises a reflection of the first ultrasonic signal from a first moving object; providing data corresponding to the second ultrasonic signal to a motion processing unit; processing, by the motion processing unit, the data corresponding to the second ultrasonic signal, wherein a distance processing unit included in the sensor device is turned off when the motion processing unit is processing the data corresponding to the second ultrasonic signal; transmitting, a second transmitter of the one or more transmitter devices, a third ultrasonic signal based on the processing of the data corresponding to the second ultrasonic signal; receiving, at a second receiver of the one or more receiver devices, a fourth ultrasonic signal; providing data corresponding to the fourth ultrasonic signal to the distance processing unit for processing; and, processing, by the distance processing unit, the data corresponding to the fourth ultrasonic signal to determine a distance between the sensor device and the first moving object, wherein the motion processing unit included in the sensor device is turned off when the distance processing unit is processing the data corresponding to the fourth ultrasonic signal.

DETAILED DESCRIPTION

Embodiments of the disclosure provides for systems and methods for combined motion and distance sensing in a single device. Embodiments of the disclosure implement both a motion sensor function and a distance sensor function within the same hardware device, thereby significantly reducing the overall system cost. In addition, some embodiments provide for improved power efficiency by turning off distance sensor functionality while the motion sensor functionality is operating, and turning off motion sensor functionality while the distance sensor functionality is operating. This may include turning off certain processing units and/or one or more receiving and transmitting devices, as disclosed in greater detail herein.

In some embodiments, a transducer in a sensor device is used for both motion sensing and distance measuring. According to various embodiments, the transducer may be infrared, acoustic, optical, or radiowave. In one embodiment, the sensor device is an ultrasound-based motion and distance sensor. One or more processing units are included in the sensor device. The one or more processing units implement the motion sensing and distance measuring. In one embodiment, separate processing hardware performs each of motion sensing and distance measuring. In another embodiment, motion sensing and distance measuring are both performed by the same processing hardware. The motion sensing and distance measuring can be implemented in hardware, software, or a combination of hardware and software.

Figure 1:
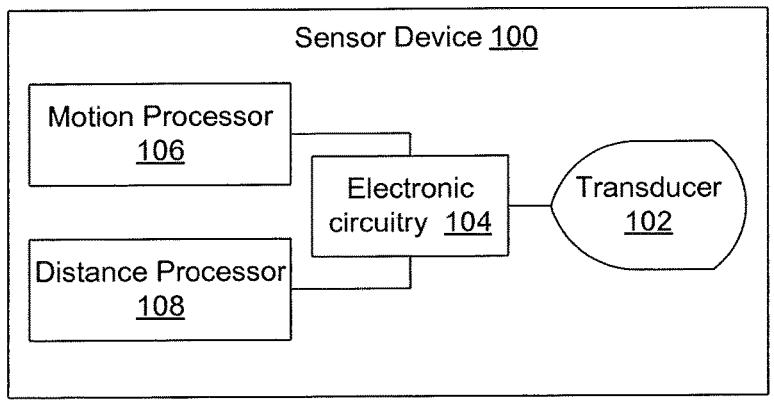
FIG. 1 is a block diagram illustrating a sensor device, in accordance with one embodiment of the disclosure.

FIG. 1 is a block diagram illustrating a sensor device 100, in accordance with one embodiment of the disclosure. As shown, the sensor device 100 includes a transducer 102, electronic circuitry 104 for the transducer, a motion processing device 106, and a distance processing device 108. According to various embodiments, the transducer 102 may be infrared, acoustic, optical, or radiowave. In one embodiment, the sensor device 100 is an ultrasound-based motion and distance sensor.

In one embodiment, the motion processing device 106 and the distance processing device 108 are separate processing devices that perform motion sensing and distance measuring, respectively. In another embodiment, the motion processing device 106 and the distance processing device 108 are implemented in a single processing device that executes software to perform motion sensing and distance measuring.

Figure 2A:
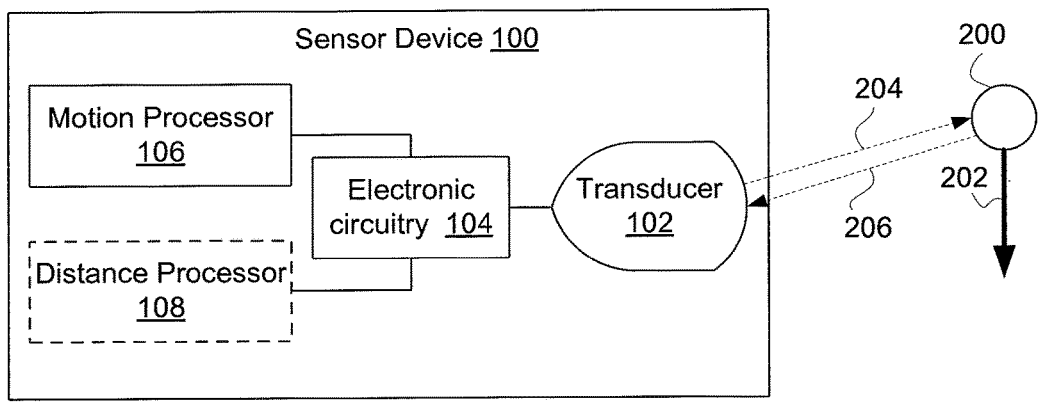
FIGS. 2A-2B are block diagrams illustrating the sensor device in FIG. 1 in operation, in accordance with one embodiment of the disclosure.
Figure 2B:
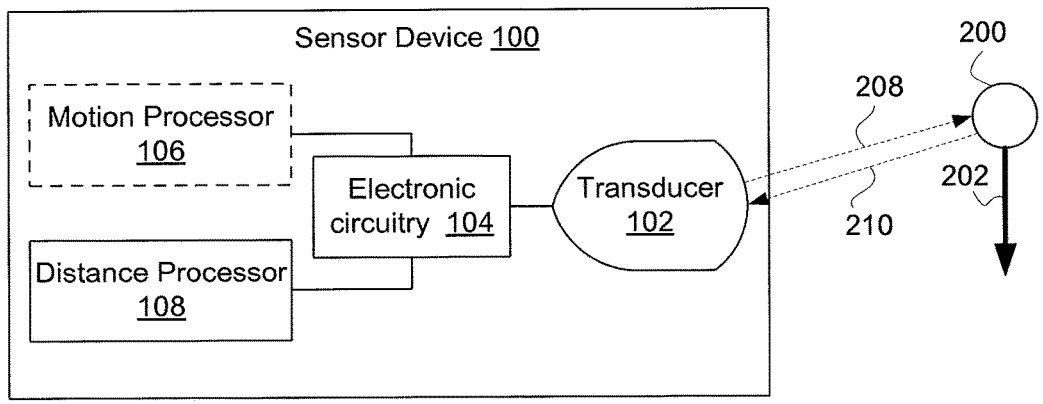

FIGS. 2A-2B are block diagrams illustrating the sensor device 100 in FIG. 1 in operation, in accordance with one embodiment of the disclosure. As shown in FIG. 2A, an object 200 may be in the range of the sensor device 100. The object 200 may be moving, as represented by a velocity vector 202. In FIG. 2A, a signal 204 is transmitted by the transducer 102 that is reflected from the object 200 as signal 206. For example, in the implementation where the transducer 102 is an acoustic transducer, the acoustic transducer emits an ultrasonic wave, which is reflected (i.e., bounced back) the object 200, such as a moving human being. While the signal 204 is being transmitted and reflected back as signal 206, the motion processing device 106 is active and processing. This is represented in FIG. 2A by a solid outline around motion processing device 106. The motion processing device 106 can be implemented using conventional active ultrasound motion sensor methodology, such as implementing a doppler method (i.e., a moving object causes shifted frequency component) or an envelope detection method (i.e., a moving object causes the reflected signal amplitude to change), among other implementations. In some embodiments, the sensor device 100 may incorporate more than one motion sensing technology for better performance.

As also shown in FIG. 2A, during the time that the motion processing device 106 is active and processing, the distance processing device 108, is turned off and is inactive. This is represented in FIG. 2A by a dashed outline around distance processing device 108. Turning off the distance processing device 108 while the motion processing device 106 is active provides for a more power-efficient sensor device 100.

As shown in FIG. 2A, once the sensor device 100 detects a moving object 200 (i.e., via the signals 204, 206 as described above), a signal 208 is transmitted by the transducer 102 that is reflected from the object 200 as signal 210. The signal 210 is passed by the electronic circuitry 104 to the distance processing device 108, which processes the signal to determine a distance between the sensor device 100 and the object 200. In one embodiment, the distance can be computed by the distance processing device 108 using the time-of-flight method, which determines the time it takes for the signal 208 to be transmitted to the object 200 and reflected as signal 210 and computes the distance based on the round-trip time.

As also shown in FIG. 2B, during the time that the distance processing device 108 is active and processing, the motion processing device 106 is turned off and is inactive. This is represented in FIG. 2B by a dashed outline around motion processing device 106. Turning off motion processing device 106 while the distance processing device 108 is active provides for a more power-efficient sensor device 100.

In some embodiments, the technique illustrated in FIGS. 2A-2B to determine the distance between a sensor device 100 and a moving object 200 can be repeated for each moving object within the range of the sensor device 100. Doing so provides the single sensor device 100 with the ability to determine a three-dimensional mapping of the locations of moving objects within its surroundings. This information can then be used to implement a wide variety of previously unknown use cases, as described in greater detail herein.

Figure 3A:
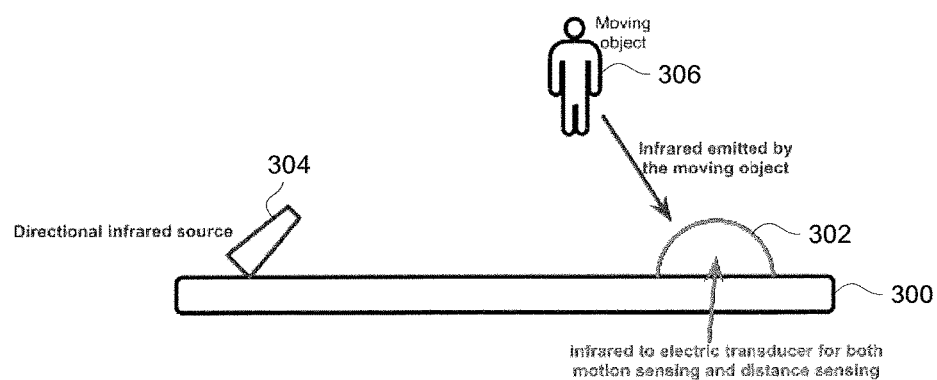
FIGS. 3A-3B are block diagrams illustrating an infrared sensor device, in accordance with one embodiment of the disclosure.
Figure 3B:
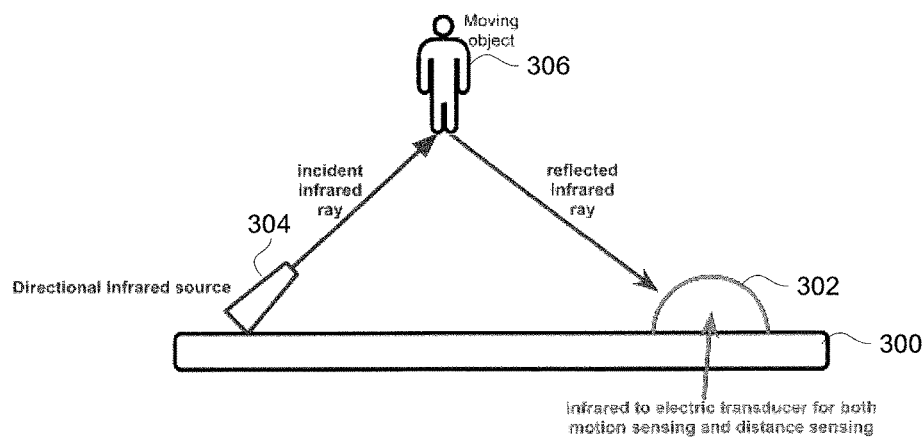

FIGS. 3A-3B are block diagrams illustrating an infrared sensor device 300, in accordance with one embodiment of the disclosure. As shown, the infrared sensor device 300 includes a motion processing device 302 and a distance processing device 304. In some embodiments, the motion processing device 302 can be implemented as an infrared camera or an infrared photo-diode mounted on a scanning mechanism. In some embodiments, the distance processing device 304 may be implemented as a directional infrared source configured to emit an infrared signal.

FIG. 3A shows the sensor device 300 in a passive infrared motion sensing mode. A moving object 306 emits a different infrared pattern than its immediate surroundings. The motion processing device 302 (e.g., an infrared transducer) can detect moving objects based on the change of infrared pattern. While the motion processing device 302 is performing such detection, the distance processing device 304 can be turned off and inactive. This provides some power efficiencies in the sensor device 300.

Once the motion processing device 302 detects a moving object 306, the sensor device 300 enters an active infrared triangulation distance sensing mode. The distance processing device 304 is turned on and activated. An incident infrared ray transmitted from the distance processing device 304 (e.g., a directional infrared source) is reflected off the moving object 306 towards the motion processing device 302 (e.g., an infrared transducer). Since the infrared source and the infrared transducer are both directional, a distance to the object 300 can be determined by triangulation.

Figure 4A:
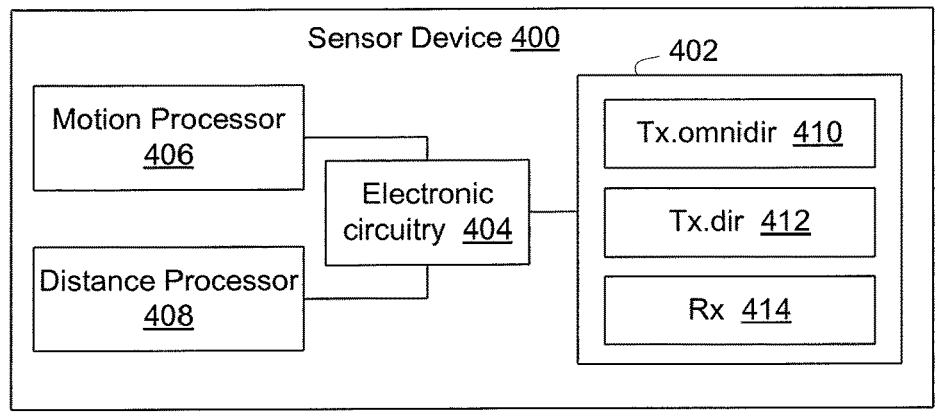
FIGS. 4A-4C are block diagrams illustrating a sensor device with two transmitting elements and one receiving element, in accordance with one embodiment of the disclosure.
Figure 4B:
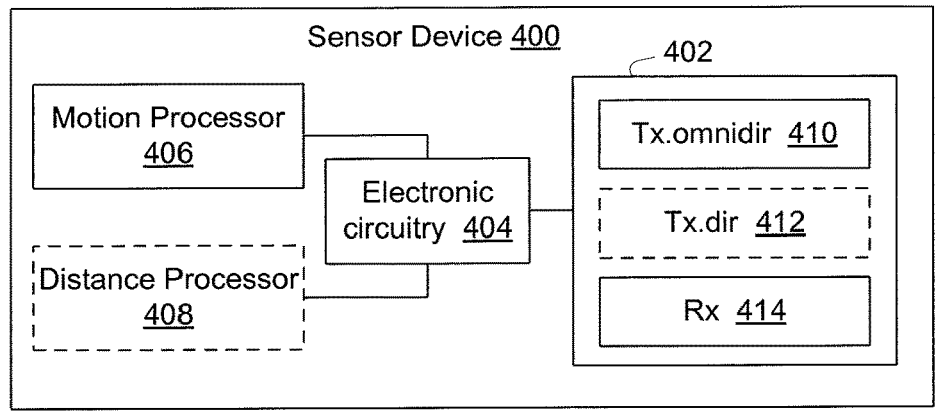
Figure 4C:
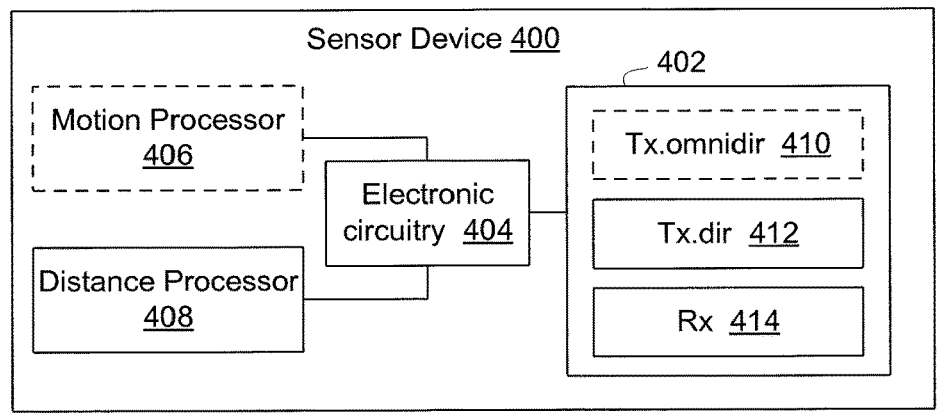

FIGS. 4A-4C are block diagrams illustrating a sensor device 400 with two transmitting elements and one receiving element, in accordance with one embodiment of the disclosure. As shown in FIG. 4A, the sensor device 400 may include a transducer 402, electronic circuitry 404 for the transducer, a motion processing device 406, and a distance processing device 408. According to various embodiments, the transducer may be infrared, acoustic, optical, or radiowave. In one embodiment, the sensor device 400 is an ultrasound-based motion and distance sensor. As also shown, the transducer 402 includes an omnidirectional transmitter 410, a directional transmitter 412, and a receiver 414. The omnidirectional transmitter 410, when active, emits ultrasonic waves in multiple directions (for example, in all directions in one or more planes). The directional transmitter 412, when active, emits ultrasonic waves in a single direction. The direction is configurable such that the directional transmitter 412 is able to be positioned to emit waves in a particular direction.

As shown in FIG. 4B, during a "motion detection mode" of the sensor device 400, the omnidirectional transmitter 410 and the receiver 414 are active and operational. The directional transmitter 412 is turned off and is inactive. In addition, the motion processing device 406 is active; whereas, the distance processing device 408 is off and inactive. The off and inactive directional transmitter 412 and distance processing device 408 are represented in FIG. 4B with dashed lines.

In operation, the omnidirectional transmitter 410 emits waves in all directions looking for moving objects. When a moving object passes within range of the waves emitted by the omnidirectional transmitter 410, a reflection wave is reflected off the object and received by the receiver 414. The motion processing device 406 can perform processing on the reflected wave to, among other things, identify a direction from which the reflection wave was received by the receiver 414.

Once motion is detected, the sensor device 400 enters a "distance calculation mode," as shown in FIG. 4C. As shown, the directional transmitter 412 and the receiver 414 are active and operational. The omnidirectional transmitter 410 is turned off and is inactive. In addition, the distance processing device 408 is active; whereas, the motion processing device 406 is off and inactive. The off and inactive omnidirectional transmitter 410 and motion processing device 406 are represented in FIG. 4C with dashed lines.

In operation, the directional transmitter 412 emits waves in the direction of the moving object and waits for a reflection wave to be reflected off the object and received by the receiver 414. The distance processing device 408 can perform processing on the reflected wave to, among other things, identify a distance between the sensor device 400 and the moving object, e.g., by performing time-of-flight analysis.

Figure 5A:
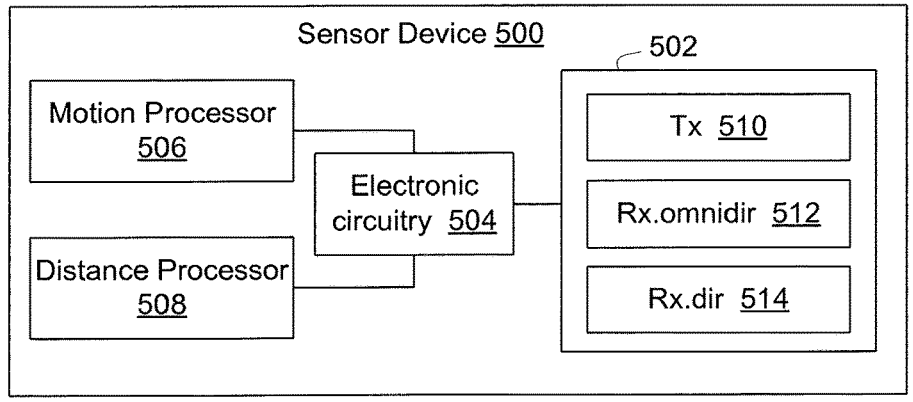
FIGS. 5A-5C are block diagrams illustrating a sensor device with two receiving elements and one transmitting element, in accordance with one embodiment of the disclosure.
Figure 5B:
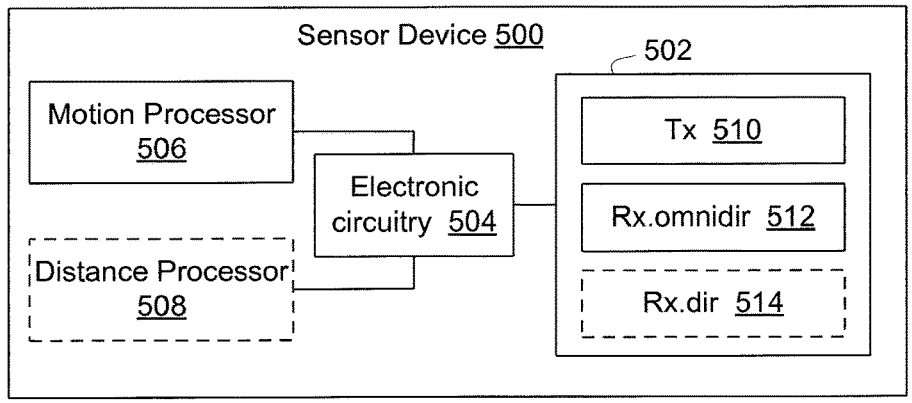
Figure 5C:
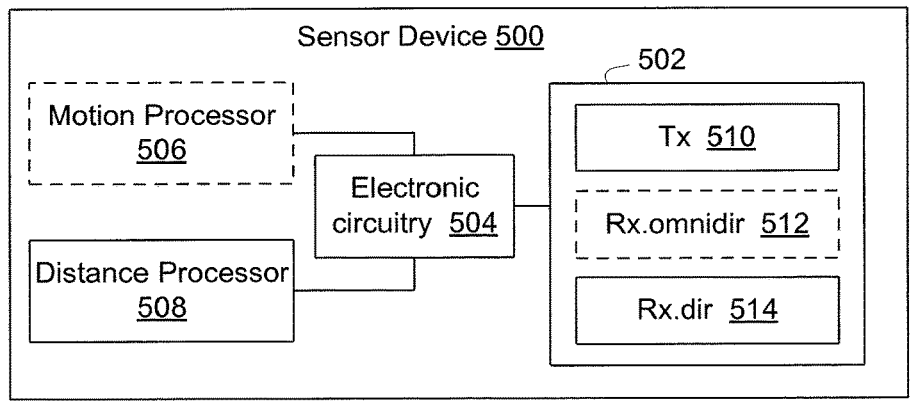

FIGS. 5A-5C are block diagrams illustrating a sensor device 500 with two receiving elements and one transmitting element, in accordance with one embodiment of the disclosure. As shown in FIG. 5A, the sensor device 500 may include a transducer 502, electronic circuitry 504 for the transducer, a motion processing device 506, and a distance processing device 508. According to various embodiments, the transducer may be acoustic, optical, or radiowave. In one embodiment, the sensor device 500 is an ultrasound-based motion and distance sensor. As also shown, the transducer 502 includes a transmitter 510, an omnidirectional receiver 512, and a directional receiver 514. The omnidirectional receiver 512, when active, can receive ultrasonic waves incident from multiple directions. The directional receiver 514, when active, can receive ultrasonic waves incident from a single direction.

As shown in FIG. 5B, during a "motion detection mode" of the sensor device 500, the transmitter 510 and the omnidirectional receiver 512 are active and operational. The directional receiver 514 is turned off and is inactive. In addition, the motion processing device 506 is active; whereas, the distance processing device 508 is off and inactive. The off and inactive directional receiver 514 and distance processing device 508 are represented in FIG. 5B with dashed lines.

In operation, the transmitter 510 emits waves in all directions looking for moving objects. When a moving object passes within range of the waves emitted by the transmitter 510, a reflection wave is reflected off the object and received by the omnidirectional receiver 512. The motion processing device 506 can perform processing on the reflected wave to, among other things, identify a direction from which the reflection wave was received by the omnidirectional receiver 512.

Once motion is detected, the sensor device 500 enters a "distance calculation mode," as shown in FIG. 5C. As shown, the transmitter 510 and the directional receiver 514 are active and operational. The omnidirectional receiver 512 is turned off and is inactive. In addition, the distance processing device 508 is active; whereas, the motion processing device 506 is off and inactive. The off and inactive omnidirectional receiver 512 and motion processing device 506 are represented in FIG. 5C with dashed lines.

In operation, the transmitter 510 emits waves in the direction of the moving object and waits for a reflection wave to be reflected off the object and received by the directional receiver 514. The distance processing device 508 can perform processing on the reflected wave to, among other things, identify a distance between the sensor device 500 and the moving object, e.g., by performing time-of-flight analysis.

Figure 6A:
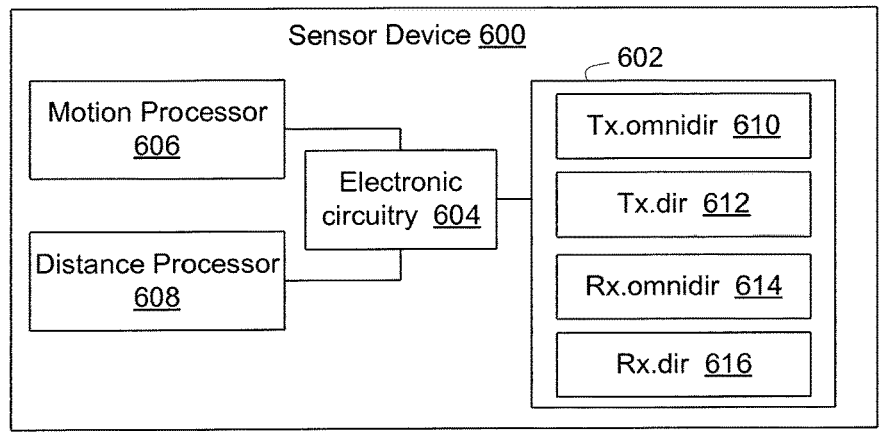
FIGS. 6A-6C are block diagrams illustrating a sensor device 600 with two receiving elements and two transmitting elements, in accordance with one embodiment of the disclosure.
Figure 6B:
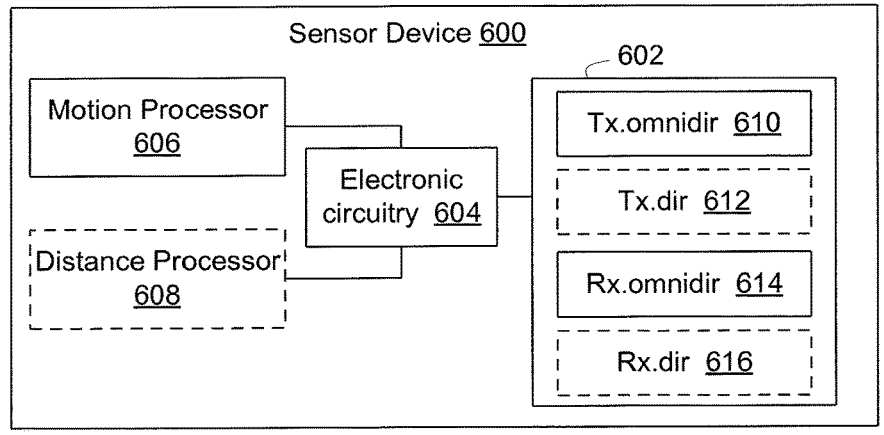
Figure 6C:
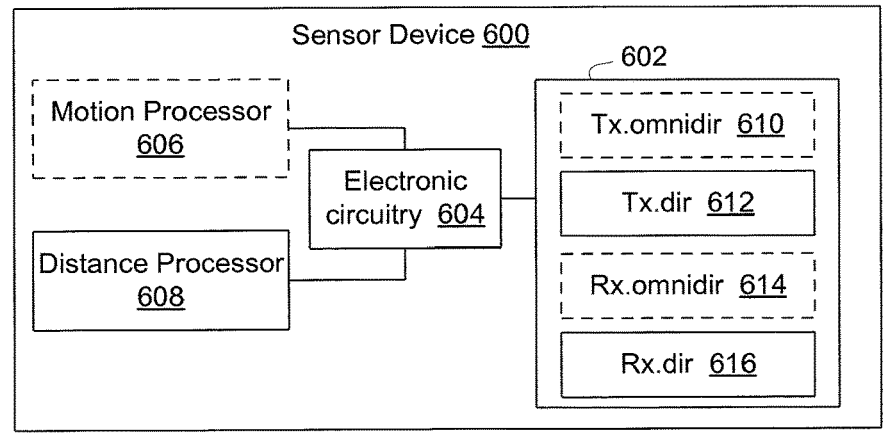

FIGS. 6A-6C are block diagrams illustrating a sensor device 600 with two receiving elements and two transmitting elements, in accordance with one embodiment of the disclosure. As shown in FIG. 6A, the sensor device 600 may include a transducer 602, electronic circuitry for the transducer 604, a motion processing device 606, and a distance processing device 608. According to various embodiments, the transducer may be acoustic, optical, or radiowave. In one embodiment, the sensor device 600 is an ultrasound-based motion and distance sensor. As also shown, the transducer 602 includes an omnidirectional transmitter 610, a directional transmitter 612, an omnidirectional receiver 614, and a directional receiver 616.

As shown in FIG. 6B, during a "motion detection mode" of the sensor device 600, the omnidirectional transmitter 610 and the omnidirectional receiver 614 are active and operational. The directional transmitter 612 and the directional receiver 616 are turned off and are inactive. In addition, the motion processing device 606 is active; whereas, the distance processing device 608 is off and inactive. The off and inactive directional transmitter 612, directional receiver 616, and distance processing device 608 are represented in FIG. 6B with dashed lines.

In operation, the omnidirectional transmitter 610 emits waves in all directions looking for moving objects. When a moving object passes within range of the waves emitted by the omnidirectional transmitter 610, a reflection wave is reflected off the object and received by the omnidirectional receiver 614. The motion processing device 606 can perform processing on the reflected wave to, among other things, identify a direction from which the reflection wave was received by the omnidirectional receiver 614.

Once motion is detected, the sensor device 600 enters a "distance calculation mode," as shown in FIG. 6C. As shown, the directional transmitter 612 and the directional receiver 616 are active and operational. The omnidirectional transmitter 610 and the omnidirectional receiver 614 are turned off and are inactive. In addition, the distance processing device 608 is active; whereas, the motion processing device 606 is off and inactive. The off and inactive omnidirectional transmitter 610, omnidirectional receiver 614, and motion processing device 606 are represented in FIG. 6C with dashed lines.

In operation, the directional transmitter 612 emits waves in the direction of the moving object and waits for a reflection wave to be reflected off the object and received by the directional receiver 616. The distance processing device 608 can perform processing on the reflected wave to, among other things, identify a distance between the sensor device 600 and the moving object, e.g., by performing time-of-flight analysis.

Figure 7:
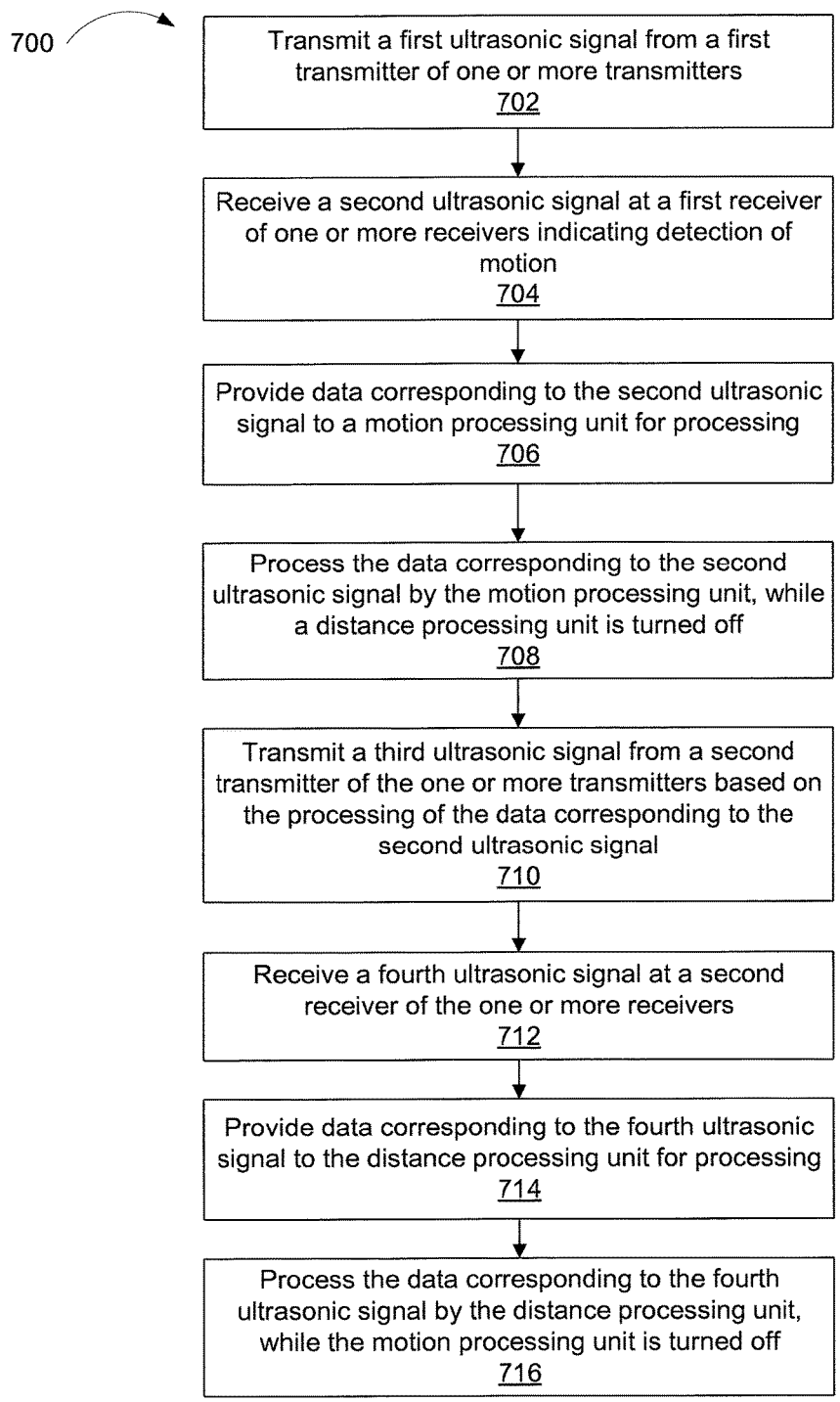
FIG. 7 is a flow diagram of method steps for detecting motion and calculating distance to a moving object by a sensor device, according to one embodiment of the disclosure.

FIG. 7 is a flow diagram of method steps for detecting motion and calculating distance to a moving object by a sensor device, according to one embodiment of the disclosure. As shown, the method 700 begins at step 702, where a sensor device transmits a first ultrasonic signal from a first transmitter of one or more transmitters. As described, the first ultrasonic signal can be infrared, acoustic, optical, radiowave, or any other type of signal. In embodiments that incorporate a "passive" motion detection scheme, such as the passive infrared implementation shown in FIG. 3A, step 702 can be omitted.

At step 704, the sensor device receives a second ultrasonic signal at a first receiver of one or more receivers indicating detection of motion. In some embodiments, the second ultrasonic signal is a reflected signal that reflects off a moving object and is received by the first receiver. At step 706, the sensor device provides data corresponding to the second ultrasonic signal to a motion processing unit for processing. At step 708, the sensor device process the data corresponding to the second ultrasonic signal by the motion processing unit, while a distance processing unit is turned off.

At step 710, the sensor device transmits a third ultrasonic signal from a second transmitter of the one or more transmitters based on the processing of the data corresponding to the second ultrasonic signal. In one embodiment, the first and second transmitters are different transmitting devices. In another embodiment, the first and second transmitters are the same transmitting device.

At step 712, the sensor device receives a fourth ultrasonic signal at a second receiver of the one or more receivers. In some embodiments, the fourth ultrasonic signal is a reflected signal that reflects off the moving object and is received by the second receiver. In one embodiment, the first and second receivers are different receiving devices. In another embodiment, the first and second receivers are the same receiving device.

At step 714, the sensor device provides data corresponding to the fourth ultrasonic signal to the distance processing unit for processing. At step 716, the sensor device processes the data corresponding to the fourth ultrasonic signal by the distance processing unit, while the motion processing unit is turned off.

The method 700 can be repeated for each moving object within the range of the sensor device 100. Doing so provides the single sensor device with the ability to determine a three-dimensional mapping of locations of moving objects within its surroundings. This is information can then be used to implement a wide variety of previously unknown use cases, as described in greater detail herein.

According to first example use case, a sensor device as disclosed herein can be implemented as part of a garage door opener. For example, the sensor device may be mounted on or near a garage and can detect motion of objects in front of the garage. The detected motion can have a directionality component by, for example, sampling the motion at multiple times to determine a direction of travel. Once the sensor device detects that a car is approaching the garage, the sensor device can determine a distance between the sensor device and the approaching car. The distance between the approaching car and the garage can be monitored, such that once the approaching car is within a threshold distance of the garage, the garage automatically opens. Conversely, embodiments of the disclose can also be used to automatically close a garage door once a car has exited the garage and the car has moved a minimum distance away from the garage. In some embodiments, additional filtering steps should be performed as appropriate to disambiguate between objects that are not cars (e.g., a person walking by) and to confirm that the car that is approaching is authorized to enter the garage (e.g., by checking the license plate by video recognition).

According to a second example use case, a sensor device as disclosed herein can be implemented as part of indoor home or office automation. For example, the sensor device can be installed in a living room of a home or a common area of an office building. The sensor device detects motion within its range of each moving person, and then computes a distance from the sensor device to the moving person. Multiple moving persons may be detected within the range of the sensor device. As such, a three-dimensional map of the people in the room can be determined. This information can be used for a wide variety of specific scenarios. In the context of a living room, the sensor device may be preprogrammed to know the location of certain furniture in the living room, e.g., couch, table, chairs, TV, etc. If the sensor device detects movement of a person from an entryway to the living room to the couch, then the sensor device can automatically cause the TV to be turned on and a prompt to be displayed to the user asking the user what the user wishes to watch on TV. In the office context, the sensor device can be used to count the number of people in the room and determine their relative locations. This can be used, for example, for employee counts.

According to a third example use case, a sensor device as disclosed herein can be implemented as part of warehouse or fulfillment center lighting. For example, the sensor device can be installed in a warehouse or fulfillment center and can be used to control the lighting in the warehouse or fulfillment center. As people move throughout the warehouse, the sensor device can detect the movement of those people, and compute the distance (and direction) to those moving persons. The lights of the warehouse or fulfillment center in the areas where people are moving can be turned on, while the rest of the lights can be turned off. This can save on electricity costs to light up the warehouse or fulfillment center. It should be noted that this specific use case cannot be implemented using a traditional motion/occupancy sensor. In order to achieve the same resulting using traditional motion/occupancy sensors, hundreds if not thousands of traditional motion/occupancy sensors would need to installed throughout the warehouse or fulfillment center. In the use case of the disclosed sensor device, a single sensor device could be used to cover the entire area within the range of the sensor device. Using only a single sensor device provides a huge cost and operation efficiency advantage over using traditional motion/occupancy sensors.

Figure 8:
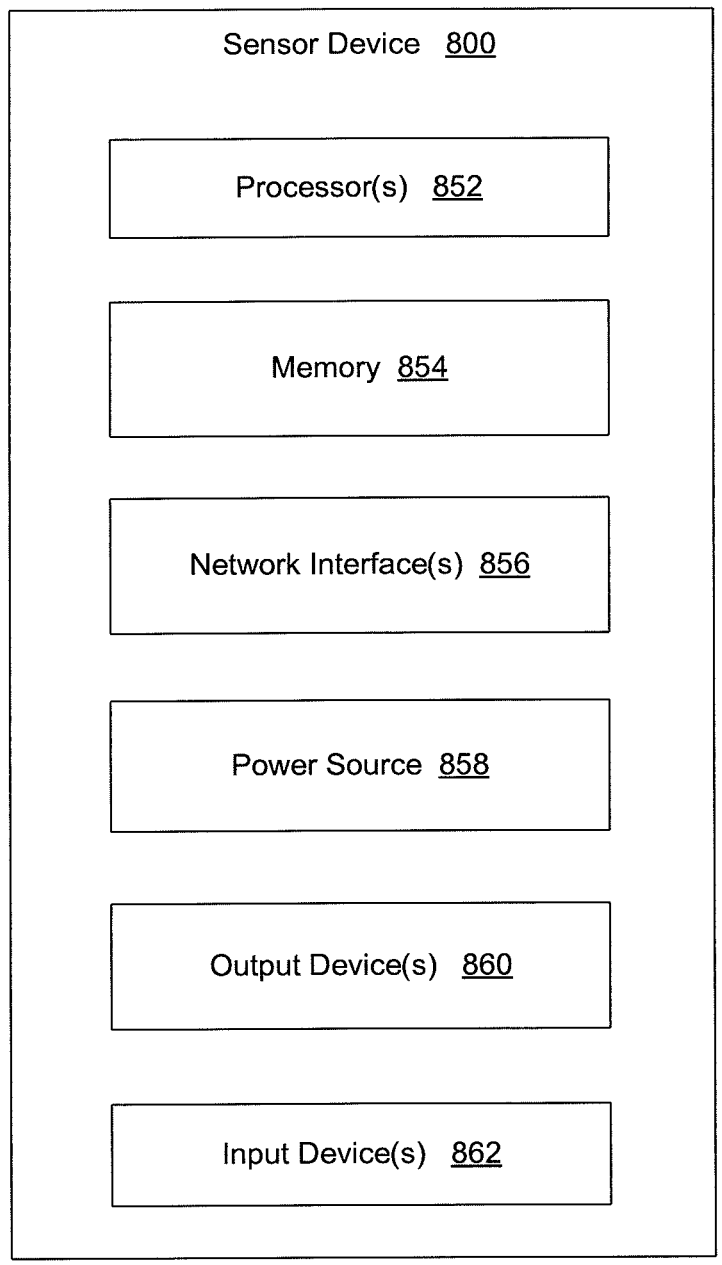
FIG. 8 provides a block diagram illustrating components of a sensor device, according to one embodiment of the disclosure.

FIG. 8 provides a block diagram illustrating components of a sensor device 804, according to one embodiment of the disclosure. Sensor device 804 includes one or more processors 852, memory 854, network interfaces 856, and power source 858. Sensor device 804 may include output devices 860 (for example, transmitters) and input devices 862 (for example, receivers). Each of the components including the processor 852, memory 854, network interface 856, power source 858, output devices 860, and input devices 862 is interconnected physically, communicatively, and/or operatively for inter-component communication.

The processors 852 are configured to implement functionality and/or process instructions for execution within the sensor device 804. As described above, the processors 852 may include a motion processing device and a separate a distance processing device. For example, the processors 852 execute instructions stored in one or more memories 854.

Memory 854 may be a non-transient, computer-readable storage medium, configured to store information within sensor device 804 during operation. In certain embodiments, the processors 852 and memory 854 are implemented as a control circuit or a super unit incorporating the functions of both processor 852 and memory 854. A motivation for this combination may be to reduce power consumption by utilizing application specific integrated circuits (ASICs). In certain aspects of the disclosure, the functionality of a control circuit that can react to sensing inputs are much more important than the specific implementation or demarcation between functionality prescribed to processor 852 or those prescribed to memory 854.

Sensor device 804 provides one or more network interfaces 856 for communication with external devices via one or more networks as depicted in FIG. 8A. In some embodiments, network interfaces 856 are omitted from the sensor device 804. In certain embodiments, network interface(s) 856 provides a communication interface to a network in order to facilitate communication to a network element. Network interface(s) 856 may be a network interface card, such as an Ethernet card, an optical transceiver, a radio frequency transceiver, or any other type of device that can send and receive information. Non-limiting examples of network interface(s) 856 include Bluetooth® radios, 3G radios, WiFi radios, Universal Serial Bus (USB), ANT compatible radios, ZigBee compatible radios, Thread™ compatible radios, near field communication radios, ultra-wide band compatible radios, 800 MHz compatible radios, and body area network interfaces compatible with sending and receiving signals through human skin. In certain embodiments, sensor device 804 may have network interface(s) 856 that provide access to multiple networks. Network interface(s) 856 may provide support for at least one type of network in this configuration, depending on the protocol used for network communication. For example, the network may support Bluetooth® LE communication or a cellular network, among others.

Sensor device 804 includes one or more power sources 858. Power source 858 in sensor device 804 may be designed to only provide power to one of a motion processing device or a distance processing device, depending on the state of the sensor device (i.e., in "motion detection mode" or "distance calculation mode," as described above). Non-limiting examples of power source 858 include single-use power sources, rechargeable power sources, and/or power sources developed from nickel-cadmium, lithium-ion, or other suitable material. Rechargeable power sources may be compatible with inductive chargers. In certain embodiments, power source 858 includes circuits that enable energy scavenging and a battery to store the scavenged energy. In some aspects, the battery may be charged with ambient-radiation sources, for example, ubiquitous RF energy or ambient light sources. In certain aspects, the battery may be charged using thermoelectric conversion or thermal radiance where energy is obtained from a temperature difference. The battery may be charged with vibrational excitations, for example, vibrations of floors, walls, human movement. In certain embodiments, these energy scavenging techniques are utilized without the need of a battery. A storage capacitor may be used to temporarily store the harvested energy. Additionally, these energy harvesting techniques may incorporate springs that pulse microgenerators, moving magnets or coils, microelectromechanical systems (MEMS) and nanoelectromechanical systems (NEMS) technology.

Sensor device 804 may include output devices 860. Output devices 860 are configured to provide output, for example, transmitting ultrasonic waves or other types of waves, or providing a user with tactile, audio, and/or video stimuli. In certain aspects, output devices 860 includes one or more antennas, speakers for generating ultrasonic sound waves or audible sound waves, and video display devices.

Sensor device 804 may include input devices 862. Input device(s) 862 is configured to receive input in the form of ultrasonic waves, as well as user input from a user or surrounding environment of the user through tactile, audio, and/or video feedback. Input devices 862 may include one or more antenna to receive ultrasonic waves or other types of waves. Input devices 862 may further include external sensors that monitor the environment of sensor device 804. These external sensors may be coils used to determine what is proximate to sensor device 804. For example, the sensors or coils may be used to determine if sensor device 804 is near flesh, wood, or if sensor device 804 is immersed in a liquid or gas medium. Additionally, sensor device 804 may include accelerometers or global positioning sensors that are used to determine device orientation as well as location information, respectively.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sensor device configured to detect motion of a moving object and determine distance between the moving object and the sensor device, the sensor device comprising:
    a distance processor;
    a motion processor; and
    a transducer device configured to:
        transmit a first ultrasonic signal and receive a second ultrasonic signal while the sensor device operates in a motion detection mode where the distance processor is powered off and the motion processor is powered on; and
        transmit a third ultrasonic signal and receive a fourth ultrasonic signal while the sensor device operates in a distance detection mode where the motion processor is powered off and the distance processor is powered on, wherein:
    the second ultrasonic signal comprises a reflection of the first ultrasonic signal from the moving object;
    the fourth ultrasonic signal comprises a reflection of the third ultrasonic signal from the moving object;
    the motion processor is configured to:
        power off while the sensor device operates in the distance detection mode; and
        while the sensor device operates in the motion detection mode:
            power on;
            detect, based on data corresponding to the second ultrasonic signal, the motion of the moving object; and
            in response to detecting the motion of the moving object, transition, the sensor device from operating in the motion detection mode to operating in the distance detection mode;
    the distance processor is configured to:
        power off while the sensor device operates in the motion detection mode; and
        while the sensor device operates in the distance detection mode, power on and determine, based on the data corresponding to the fourth ultrasonic signal, the distance between the sensor device and the moving object.

2. The sensor device according to claim 1, wherein the transducer device comprises:
    a first transmitting device configured to transmit the first ultrasonic signal; and
    a second transmitting device configured to transmit the third ultrasonic signal.

3. The sensor device according to claim 2, wherein the first transmitting device and the second transmitting device comprise different transmitting devices.

4. The sensor device according to claim 2, wherein the first transmitting device and the second transmitting device comprise the same transmitting device.

5. The sensor device according to claim 1, wherein the transducer device comprises:
    a first receiving device configured to receive the second ultrasonic signal; and
    a second receiving device configured to receive the fourth ultrasonic signal.

6. The sensor device according to claim 5, wherein the first receiving device and the second receiving device comprise different receiving devices.

7. The sensor device according to claim 5, wherein the first receiving device and the second receiving device comprise the same receiving device.

8. The sensor device according to claim 1, wherein the first, second, third, and fourth ultrasonic signal comprise infrared, acoustic, optical, or radiowave signals.

9. The sensor device according to claim 1, wherein the sensor device causes a garage door to be opened based on the processing of the data corresponding to the fourth ultrasonic signal.

10. The sensor device according to claim 1, wherein the sensor device causes a light to be turned on or off based on the processing of the data corresponding to the fourth ultrasonic signal.

11. A method for detecting motion of a moving object and determining distance between the moving object and a sensor device, the method comprising:
    while the sensor device operates in a motion detection mode:
        powering off a distance processor of the sensor device;
        powering on a motion processor of the sensor device;
        transmitting, from a single transducer of the sensor device, a first ultrasonic signal;
        receiving, at the single transducer, a second ultrasonic signal, wherein the second ultrasonic signal comprises a reflection of the first ultrasonic signal from the moving object;
        detecting, by the motion processor, based on data corresponding to the second ultrasonic signal, the motion of the moving object;
    in response to detecting the motion of the moving object, transitioning, by the sensor device, from operating in the motion detection mode to operating in the distance detection mode;
    while the sensor device operates in the distance detection mode:
        powering on the distance processor;
        powering off the motion processor;
        transmitting, from the single transducer, a third ultrasonic signal;
        receiving, at the single transducer, a fourth ultrasonic signal;
        and
        determining, by the distance processor, based on data corresponding to the fourth ultrasonic signal, the distance between the moving object and the sensor device.

12. The method according to claim 11, wherein the first receiver and the second receiver comprise different receiver devices.

13. The method according to claim 11, wherein the first receiver and the second receiver comprise the same receiver device.

14. The method according to claim 11, wherein the first transmitter and the second transmitter comprise different transmitter devices.

15. The method according to claim 11, wherein the first transmitter and the second transmitter comprise the same transmitter device.

16. The method according to claim 11, wherein the first, second, third, and fourth ultrasonic signal comprise infrared, acoustic, optical, or radiowave signals.

17. The method according to claim 11, further comprising:
   causing a garage door to be opened based on the processing of the data corresponding to the fourth ultrasonic signal.

18. The method according to claim 11, further comprising:
   causing a light to be turned on or off based on the processing of the data corresponding to the fourth ultrasonic signal.

19. A non-transitory computer-readable storage medium storing instruction that, when executed by one or more processors, causes a sensor device to detect motion of a moving object and determine a distance between the moving object and the sensor device, by performing the steps of:
   while the sensor device operates in a motion detection mode:
      powering off a distance processor of the one or more processors;
      powering on a motion processor of the one or more processors;
      transmitting, from a single transducer of the sensor device, a first ultrasonic signal;
      receiving, at the single transducer, a second ultrasonic signal, wherein the second ultrasonic signal comprises a reflection of the first ultrasonic signal from the moving object;
      detecting, by the motion processor, based on data corresponding to the second ultrasonic signal, the motion of the moving object;
   in response to detecting the motion of the moving object, transitioning, by the sensor device, from operating in the motion detection mode to operating in the distance detection mode;
   while the sensor device operates in the distance detection mode:
      powering on the distance processor;
      powering off the motion processor;
      transmitting, from the single transducer, a third ultrasonic signal;
      receiving, at the single transducer, a fourth ultrasonic signal;
      and
      determining, by the distance processor, based on data corresponding to the fourth ultrasonic signal, the distance between the moving object and the sensor device.

20. The sensor device of claim 1, further comprising a single power source configured to power the distance processor and not the motion processor while the sensor device operates in the distance detection mode, and is configured to power the motion processor and not the distance processor while the sensor device operates in the motion detection mode.

* * * * *